United States Patent [19]

Bichsel

[11] 4,455,933

[45] Jun. 26, 1984

[54] APPARATUS AND METHOD FOR SIMULTANEOUSLY PRINTING AND EMBOSSING PLASTIC AND SEALING AND/OR TEAR SEALING THE SAME

[76] Inventor: Arthur W. Bichsel, 505 Bay 5th St., West Islip, N.Y. 11795

[21] Appl. No.: 387,379

[22] Filed: Jun. 11, 1982

[51] Int. Cl.$^3$ .............................................. B44B 5/02
[52] U.S. Cl. ....................................... 101/27; 101/31
[58] Field of Search ..................... 101/8, 9, 10, 11, 21, 101/25, 27, 31, 109, 379; 264/25, 26, 27

[56] References Cited

U.S. PATENT DOCUMENTS

| | | | |
|---|---|---|---|
| 2,301,010 | 11/1942 | Boutiette | 101/31 X |
| 2,564,397 | 8/1951 | Duddy | 264/26 X |
| 3,791,906 | 2/1974 | Farkas | 264/26 X |

*Primary Examiner*—Edgar S. Burr
*Assistant Examiner*—Charles A. Pearson
*Attorney, Agent, or Firm*—Posnack, Roberts, Cohen & Spiecens

[57] ABSTRACT

Apparatus is provided for simultaneously printing on plastic and embedding the printing in the plastic, and cutting or tear sealing out an area of the plastic within which the printing and embossing is effected. The apparatus includes a base with a printing and embossing arrangement relatively displaceable on the base. A first spring arrangement is provided between the printing and embossing arrangement and the base and a power source is provided to supply high-frequency heating power to the base. The first spring arrangement forms a path for the power to pass from the base into the printing and embossing arrangement. A second spring arrangement is coupled to the printing and embossing arrangement and insures the inking, registration and penetration of the same into the plastic when the plastic is softened due to the application of the power. According to the method, the plastic is softened and the ink is forced into and below the surface of the plastic to mix with the plastic such that the plastic is simultaneously printed upon and embossed with the inking and embossing being in registration.

10 Claims, 2 Drawing Figures

APPARATUS AND METHOD FOR SIMULTANEOUSLY PRINTING AND EMBOSSING PLASTIC AND SEALING AND/OR TEAR SEALING THE SAME

FIELD OF INVENTION

This invention relates to apparatus for printing and dielectrically embossing sheets of plastic and simultaneously sealing or tear sealing the same. The invention also relates to printing and embossing and sealing techniques.

BACKGROUND

In U.S. Pat. No. 2,631,646 J. Gannon reveals a die for use in high frequency heating. The outer wall of the die defines the embossing width and constitutes a scoring arrangement for facilitating trimming of the finished article. The arrangement utilizes dielectric heating by the use of high frequency currents.

In U.S. Pat. No. 2,011,949 E. Roberts discloses a printing, stamping and embossing machine. Thermal stamping through a colored or gold foil ribbon is employed, such as may be likened to a typewriter ribbon. The arrangement comprises a reciprocating die, a reciprocating tape-carrying frame and an arrangement for operating the die and frame in predetermined relationship so as to reciprocate the same in a common direction, but at different amplitudes to cause the die to make an impression impact on the tape during the reciprocation of the parts.

C. H. Franz, Jr. in U.S. Pat. No. 2,071,031 employs two separate operations involving first embossing the material to be treated and then utilizing an additional plate printing on the bottom of the embossing. A sheet is embossed by means of a die and matrix to form a plurality of raised surfaces upon different planes, and then a printing is effected upon an intermediate raised surface below the plane of the upper surface, while the sheet is supported upon a matrix. Such a technique allows for mis-registration of the embossing and coloring or printing.

In U.S. Pat. No. 2,123,377 G. Papp deals with die cutting and embossing using a foil or film while thermally activating an adhesive to attach labels to bottle caps. In the disclosed technique, metallized paper provided with an adhesive face is brought adjacent a bottle cap, whereafter a cutting and embossing die is brought down and cuts and embosses the strip of metallized paper. The cut label is caused to adhere to the cap. The use of an adhesive clearly distinguishes this technique from the technique of the invention, as will become apparent hereinafter.

O. St. Lawrence in U.S. Pat. No. 2,619,897 reveals a process for printing and die cutting at a common time, but the technique does not involve the application of heat and particularly dielectric heat, and there is no embossing and/or welding, nor is there in any manner suggested the embedding of ink in a polyvinylchloride material or the like, as is an object of the present invention and as will be explained hereinafter.

In U.S. Pat. No. 3,584,572 is disclosed an apparatus to simultaneously heat stamp, emboss and cut a flexible workpiece. The workpiece is impressed through a flexible substrate with a heated die with an intaglio design with the die heat transferring material on the substrate to the workpiece, whereafter the workpiece is embossed in relief of the intaglio design and the workpiece is cut as defined by the peripheral ridge line provided on the die. The ridge line flexes the substrate without rupturing the same and penetrating the workpiece to cut the workpiece. Herein printing is done separately and thermal heat, as contrasted to dielectric heat, is employed. The die is impressed against a soft rubber belt and a foil collar is transferred. There are many factors which distinguish the invention disclosed in this patent from that of the present application.

J. England in U.S. Pat. No. 3,976,004 shows a die member formed with a desired configuration. Absorbent means are placed on a metal rule for receiving a stain and a press arrangement is provided to press the metal rule into a stock-piece to emboss the design therein and stain it with the stain contained by the absorbent means. The arrangement disclosed in this patent appears to be entirely distinguishable from that of the present invention.

Thomas Rejto in U.S. Pat. No. 4,138,945 reveals a method for printing and embossing thermoplastic fabrics and like materials in which a heat transfer printing process embossing and surface-texturing materials are introduced simultaneously with the printing arrangement and material to be printed. A paper print or die is employed and distinguishes this patent from the invention of the present application.

SUMMARY OF THE INVENTION

It is an object of the invention to provide an apparatus and method for the dielectric heat embossing of polyvinylchloride and like plastics and other such materials in which an inking and embossing and sealing and tear sealing are simultaneously effected with the ink being combined with the polyvinylchloride or similar material.

It is a further object of the invention to provide for the simultaneous inking and embossing of a plastic sheet material.

Still another object of the invention is to provide for improved registration of inking, embossing and sealing and tear sealing of a plastic material or the like.

In achieving the above and other objects of the invention, there is provided an apparatus for simultaneously printing on plastic and embossing the printing in the plastic, said apparatus comprising a base member, a printing and embossing arrangement relatively displaceable on said base member, a first spring arrangement between the printing and embossing arrangement and the base member, and a power source to supply high-frequency heating power to the base member with the first spring arrangement being compressible and forming a path for the power to pass from the base member into the printing and embossing arrangement. A second spring arrangement is coupled to the printing and embossing arrangement and insures the penetration of the latter into the plastic when the plastic is softened due to the application of the high-frequency power. The second spring also allows the embossing face to raise above the seal or tear seal and be inked without getting ink on seal and tear seal surfaces.

According to a preferred embodiment of the invention, the first spring arrangement noted above is a leaf spring arrangement with the leaf springs incorporated into the same being in face-to-face contact with the printing and embossing arrangement which includes a mounting plate. The second spring arrangement is a group of helical coil springs which insure that the printing and embossing arrangement penetrates into and keeps registration with the plastic when the plastic is softened upon the application of high-frequency power. The embossing stops at just the right penetration depth to provide an ideal image. The leaf spring arrangement is preferably formed of leaf springs composed of phosphor bronze. The helical springs are preferably formed of stainless steel. The reason for this is that the leaf spring arrangement forms a path for the transfer of power in most efficient manner, as required by the results achieved in accordance with the invention. The helical spring is preferably of stainless steel or a like material, which is capable of withstanding annealing and other debilitating action caused by the application of high-frequency power. Springs of the type employed in accordance with the invention assure that a registration in the softened plastic takes place, as has been noted.

In accordance with another aspect of the invention, a tear seal arrangement encircling the printing and embossing arrangement is provided. It is adapted for cutting out an area of the plastic within which the printing and embossing is effected.

According to yet another aspect of the invention, the printing and embossing arrangement normally protrudes from the tear seal arrangement, but is forceable against the spring means to a substantially coplanar relationship with the tear seal arrangement upon application to the plastic. The printing and embossing arrangement nonetheless extends out of the tear seal arrangement to an extent to which it is desired to emboss the plastic.

According to yet another aspect of the invention, the printing and embossing arrangement includes an engraving of magnesium, brass or other metal that will withstand the pressure of physical as well as dielectric pressure for the service intended.

According to the method of the invention, there is contemplated the softening of a plastic sheet and the forcing of ink into and below the surface of the plastic to mix with the plastic and such that the plastic is simultaneously printed upon and embossed with the inking and embossing in exact registration.

A further aspect of the invention, as has been noted, involves simultaneously tear sealing or cutting out a portion of the plastic including the printing.

Other objects, features and advantages of the invention will become apparent from the following detailed description of a preferred embodiment, as illustrated in the accompanying drawing.

DETAILED DESCRIPTION

Figure 1:
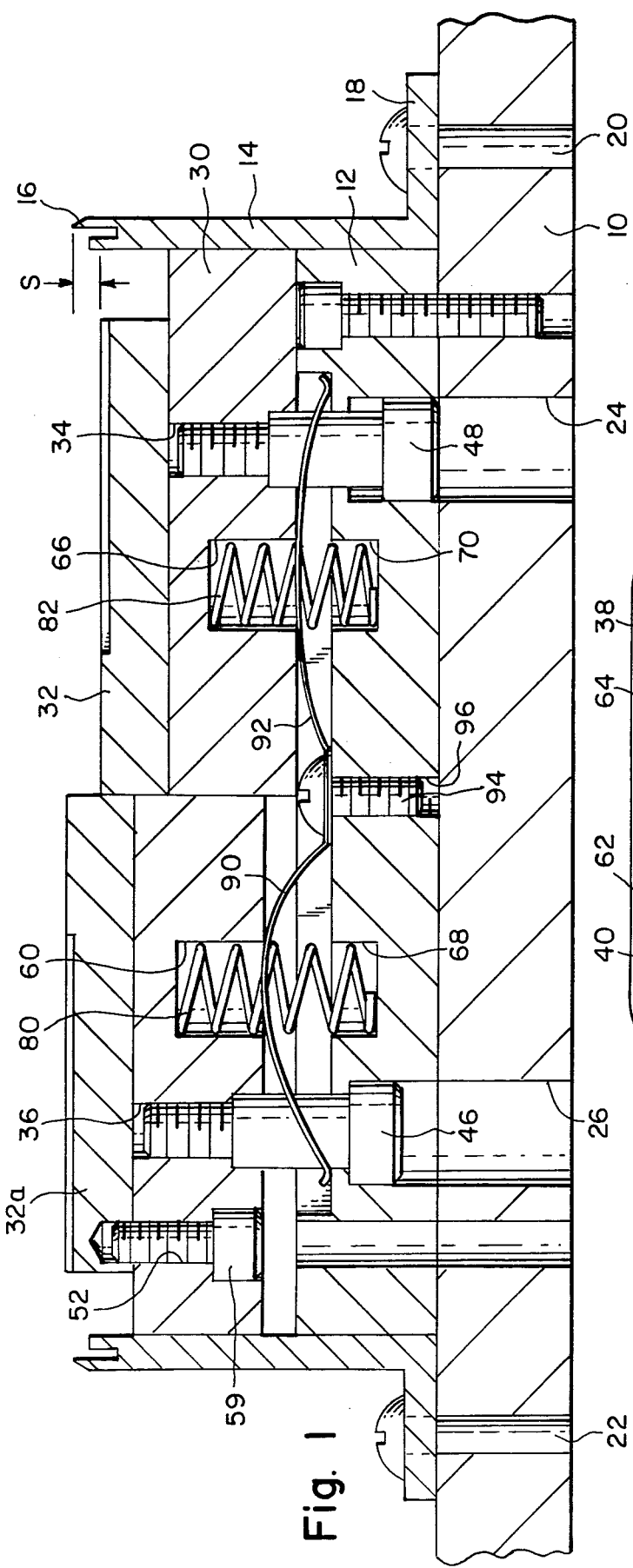
FIG. 1 is a cross sectional side view illustrating the printing and embossing and tear seal arrangements of the invention in conjunction with the spring arrangements, with the left hand side of the drawing showing the printing and embossing arrangement in full protrusion attitude and the right hand section of the drawing showing the printing and embossing arrangement fully retracted.

In the drawing is illustrated a support 10 having a base plate 12 mounted thereupon, such as by screws, welding and the like. A tear seal member 14 having an effective edge 16 includes a flange 18 which is attached to the support 10, such as by rivets or bolts 20 and 22. A number of holes of smooth bore are provided in the support 10, as well as in the base member 12. Some of these are, by way of example, indicated at 24 and 26.

Figure 2:
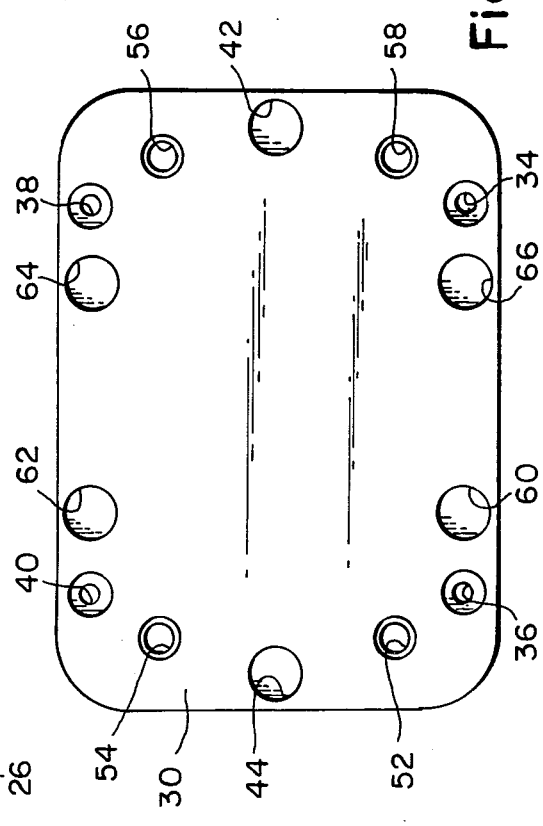
FIG. 2 is a bottom view of a support plate for the inking and embossing arrangement and demonstrating the arrangement of the helical springs employed therein.

Relatively displaceable above the base member 12 is a platform 30. This platform supports the engraving or printing and embossing member 32. The member 30 is also illustrated in FIG. 2, wherein appear openings 34 and 36 corresponding to previously noted openings 24 and 26. Further openings 38 and 40 are provided. These openings accommodate shoulder bolts, such as indicated at 46 and 48, whereby movement of platform 30 relative to base member 12 is guided and constrained. A limited amount of lateral and longitudinal displacement permissible.

Platform 30 is moreover provided with a plurality of openings 52, 54, 56 and 58, these openings accommodating bolts, such as indicated at 59, for purposes of fastening the engraving member 32 to the platform 30. For this purpose the openings 52, 54, 56 and 58 are smooth bored with engraving member 32 being provided with corresponding threaded bores.

As appears further in FIG. 2, platform 30 is provided with openings 42, 44, 60, 62, 64 and 66. These openings and corresponding openings in the base member 12, as indicated at 68 and 70, are intended to accommodate helical springs 80 and 82 and the like, which are formed of stainless steel to resist the annealing effect of high frequency power as mentioned below.

A number of leaf springs, such as illustrated at 90 and 92, are employed to constitute another separate and distinct spring arrangement having a contact area larger than 10 percent of the embossing surface to penetrate the plastic and a tension greater than 4 ozs./in.$^2$ to prevent the arcing of the high-frequency current as it passes to member 30 supporting the embossing surface. Silver or gold plating of the spring surface will allow an additional reduction of high frequency resistance to the path of the power and, when available, should be used. These leaf springs are attached to the base member 12, such as by means of mounting bolts or screws 94 accommodated in threaded openings 96 in the base member 12. The springs 90 and 92 have face-to-face contact with the bottom of the platform 30. The leaf springs are formed of phosphor bronze and are thus adapted to provide a good degree of resilience while accommodating the ready passage of high-frequency electrical current. The leaf spring in substantially fully extended attitude is illustrated in the left hand part of the figure and in compressed condition in the right hand portion of the figure. These springs, while contributing to the effort of springs 80 and 82 and the like, are not nearly as strong but are more adapted to withstand damage from the high-frequency power while transmitting it to platform 30 and engraving member 32. Accordingly, it is principally the force of the helical springs which urges the penetration of the engraving member 32 into the softened plastic. Maximum displacement of member 30 is limited by physical contact of member 30 with member 12.

In the normal attitude of the engraving member 32, it protrudes substantially fully beyond the tear seal 16, as seen at 32a. In the fully withdrawn or compressed attitude, it is fairly substantially withdrawn to a coplanar relationship with the effective edge of the tear seal, but subsides therefrom by a small amount S, which is the desired depth of penetration into the softened plastic.

The utilization of two sets of springs enables, as indicated above, the ready transfer of high-frequency power from the base to the platform, which is relatively displaceable relative thereto. The utilization of the helical springs enables the retention of sufficient force over an extended duration of time to permit the proper inking and registration of embossing of the plastic to be effected for a long period of time without maintenance and replacement of parts. The greater the contact area of the leaf springs, the less high-frequency current the helical springs will be required to pass and the less heat will be absorbed by the helical springs. The number and strength of the helical springs is such that a minimum of 10 P. S. I. should be presented to the inking assembly in order to resist the retraction of the embossing plate during the time of ink application.

The method of the invention comprises softening a sheet of plastic, such as polyvinylchloride, and forcing the ink into and below the surface of the plastic whereas the ink mixed with the softened plastic and becomes an integral part thereof. Thus, the plastic is simultaneously printed upon and embossed with the inking and embossing being in perfect registration. At the same time, there is effected simultaneously a sealing, tear sealing, and/or cutting out of the portion of the plastic including the printing and embossing with this operation being effected also in perfect registration with the printing and embossing.

In accordance with the invention, the softening of the polyvinylchloride is effected by the application of a high-frequency electrical power, the source of such power being commercially available and known per se, and therefore not requiring further eludication in this text.

There will now be obvious to those skilled in the art many modifications and variations of the apparatus and methods set forth hereinabove. These modifications and variations will not depart from the scope of the invention, if defined by the following claims.

What is claimed is:

1. Apparatus for simultaneously printing on plastic and embedding the printing in the plastic, said apparatus comprising a base member, a printing and embossing means relatively displaceable on said base member, first spring means between said printing and embossing means and said base member, power means to supply high-frequency heating power to said base member, said first spring means being compressible and forming a path for the power from the base member into said printing and embossing means, and second spring means between said printing and embossing means and base member and insuring the registration with an penetration of the latter into the plastic when the plastic is softened due to the application of said power, said first and second means respectively urging the printing and embossing means away from the base member, the second spring means being stronger than the first spring means, said first spring means including at least one leaf spring and said second spring means including at least one helical spring.

2. Apparatus as claimed in claim 1, wherein the leaf spring is of phosphor bronze plated with gold or silver.

3. Apparatus as claimed in claim 2, wherein the helical spring is of stainless steel.

4. Apparatus as claimed in claim 3 comprising a tear seal means encircling said printing and embossing means and adapted for cutting out an area of the plastic within which printing and embossing is effected.

5. Apparatus as claimed in claim 4, wherein the printing and embossing means normally protrudes from the tear seal means but is forceable against said spring means to a substantially coplanar relationship with the tear seal means upon application against the plastic.

6. Apparatus as claimed in claim 1 comprising a tear seal means encircling said printing and embossing means and adapted for cutting out an area of the plastic within which printing and embossing is effected.

7. Apparatus as claimed in claim 6, wherein the printing and embossing means normally protrudes from the tear seal means but is forceable against said spring means to a substantially coplanar relationship with the tear seal means upon application against the plastic.

8. Apparatus as claimed in claim 7, wherein said printing and embossing means includes an engraving of magnesium or brass.

9. Apparatus as claimed in claim 7, wherein said printing and embossing means is displaceable towards said base member to an extent at which the printing and embossing means withdraws behind the tear seal means substantially the extent of desired depth of embedding of the printing into the plastic subsequent to assuming said substantially coplanar relationship.

10. Apparatus as claimed in claim 1, wherein the leaf spring has a face-to-face contact with the printing and embossing means.

* * * * *